United States Patent [19]

Pappanikolaou

[11] 4,067,026
[45] Jan. 3, 1978

[54] FRONT PROJECTION SYSTEM EMBODYING A SINGLE LENS

[76] Inventor: George Pappanikolaou, 621 90th St., Brooklyn, N.Y. 11228

[21] Appl. No.: 706,780

[22] Filed: July 19, 1976

[51] Int. Cl.$^2$ ............................................. G03B 29/00
[52] U.S. Cl. ......................................... 354/77; 352/89; 353/28; 354/291; 355/45
[58] Field of Search ................... 354/77, 291; 352/47, 352/89; 355/39, 45; 353/20, 28, 30, 37

[56] References Cited

U.S. PATENT DOCUMENTS

| | | | |
|---|---|---|---|
| 2,372,430 | 3/1945 | Kals | 354/152 |
| 2,727,429 | 12/1955 | Jenkins | 352/89 |
| 2,940,371 | 6/1960 | Thurow | 355/45 X |
| 3,318,185 | 5/1967 | Kott | 353/37 X |
| 3,322,487 | 5/1967 | Renner | 354/291 X |

FOREIGN PATENT DOCUMENTS 35,456/72  9/1972  Japan ...................................... 354/77

Primary Examiner—John Gonzales
Attorney, Agent, or Firm—Lackenbach, Lilling & Siegel

[57] ABSTRACT

A front projecting system comprising a single lens which is used for photographing an object and also for projecting at the same time a transparency or image on a screen background located behind the object. With such a novel front projecting apparatus, many of the alignment problems associated with prior art dual lens front projection systems are eliminated and because of the exact registration between the object image and its shadow cast on the background, dark edge outlines (or object shadows) are also eliminated.

10 Claims, 3 Drawing Figures

FRONT PROJECTION SYSTEM EMBODYING A SINGLE LENS

BACKGROUND AND SUMMARY OF THE INVENTION

This invention relates to a photographic apparatus, and more particularly to one for use in front projection photography embodying a single lens. With such an apparatus, both the camera and projector and screen combination of the front projection system are used, for example, to photograph a foreground object in front of a background projected on the screen by an image projecting device, such as a projector.

By simply changing transparencies and models, etc. a photographer having numerous background slides or other transparencies can obtain an unusually wide range of photographs simulating real live photographic conditions as if the models were actually photographed on site at the location of the scene projected on the background screen.

The techniques of front projection photography are not new, as is exemplified by the apparatus disclosed in U.S. Pat. Nos. 3,350,980 to George D. Margolin, 3,227,509 to Hobart Baker, 3,322,489 to Eduard Renner, 3,911,450 to Jay Martin Swartz, 2,727,427 to Will F. Jenkins, 3,634,004 to Thomas W. Howard, 3,610,120 to John E. Morse, et al., 3,376,800 to Werner Faasch, 3,675,997 to Roman Andruchiew and 3,920,320 to Donovan K. Ellis, et al.

In such examples of the prior art, separate lenses are utilized for focusing a projected image on a screen, and for focusing an image of a film plane. Additionally, beam splitting sheets, generally semi-silvered mirrors, are used to separate the projected image and the image to be directed to a film plane of a camera, be it a television or motion picture camera or an ordinary still camera, such as a single lens reflex camera.

One disadvantage of such front projection systems is the problem concerning shadow cast by the foregoing objects on the background, which cannot be completely eliminated and causes a "black line" around some part of the foreground object. Obviously, any such shadow or dark edge outlines which are commonly referred to as "black line" defects, would destroy the impression of reality.

Consequently, such front projection systems of the prior art using two separate lenses are precision manufactured and relatively expensive as alignment problems are critical in that positioning of the two lenses must be exact. Also, as the lenses cannot be a perfectly matched pair, their focal lengths are slightly different, and they must be mounted so that the optical centers of the lenses coincide, and they must be almost perfectly perpendicular and/or parallel to the other optical elements of the system in order to minimize the black edge lines and reduce such black line shadow effects to an acceptable level. As a result, mounting arrangements are made with adjustable means for enabling the photographer to control such shadow problems and to maintain the proper angular relationship between the projector, camera and the beam splitter.

Accordingly, it is a principal object of the invention to provide a novel and improved front projection system.

Another object of the invention is to provide a new and improved device for eliminating the shadow or dark edge outlines without the need for major adjustments of the elements of the system.

Yet another object of the invention is to provide a front projection system which includes only a single lens for photographing an object and for projecting a transparency or image onto a screen.

Yet still another object of the invention is to provide a front projection system which is generally simple in construction, more economical to manufacture and one which is relatively simple to set up and operate.

These, and other objects of the invention, as well as the advantages of the invention, will become more fully apparent from a consideration of the accompanying specification when taken in conjunction with the drawing forming a part thereof and in which exemplary embodiments are described.

DESCRIPTION OF THE PREFERRED EMBODIMENT

Figure 1:
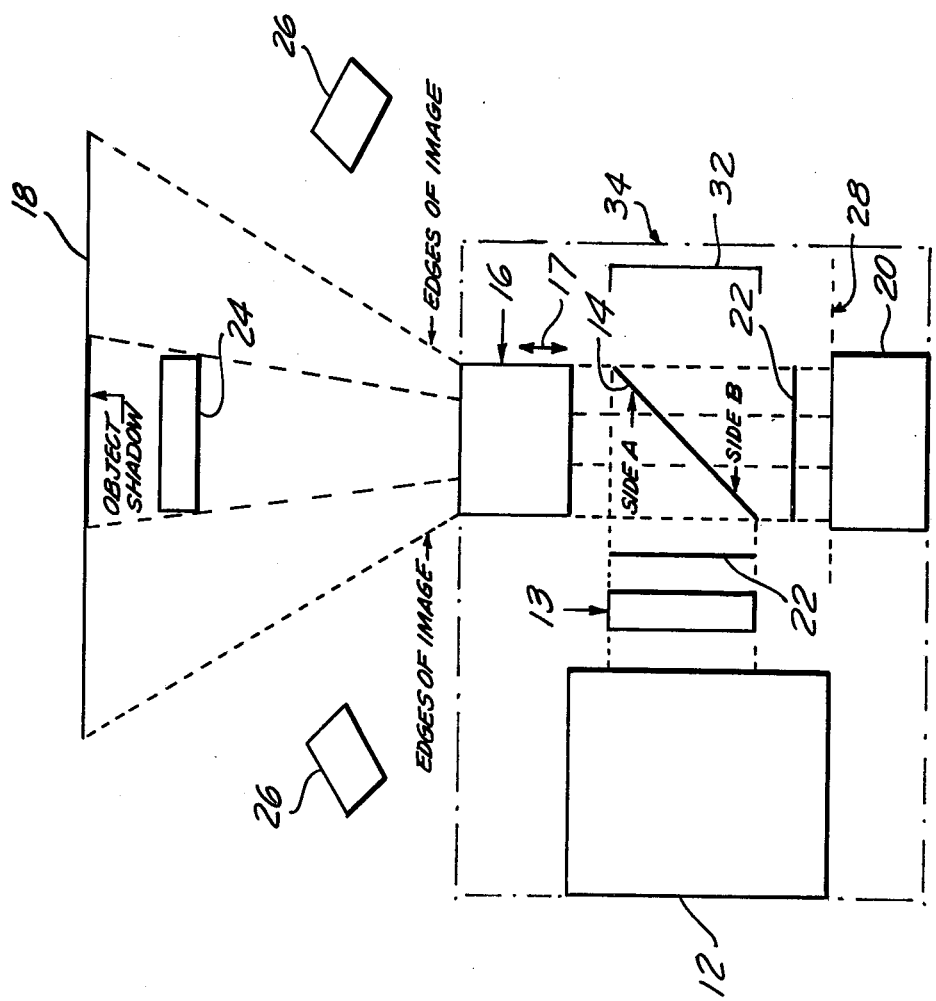
FIG. 1 is a "schematic" view of the single lens front projection system of the invention.

All of the figures of the drawing show the physical relationship between the principal elements of the front projecting system 10 of the invention. These elements for the simplest embodiment of the invention are comprised of an image projecting device 12, such as a motion picture or slide projector (without a lens) and with a slide or transparency 13 or an opaque projector (without a lens) for other than slides or transparencies or of a particular type of light source; a beam splitter 14, such as a semi-silvered mirror mounted at 45° with respect to the optical axis of a lens 16. The single lens 16 is suitably provided with a suitable focusing mount for movement in the direction of the arrows 17; a projection surface, such as a wall or a projection screen 18; and an image capturing device 20, such as a television, still or motion picture camera (without a lens). In the drawings, the image capturing device 20 is represented by a "ground glass" with film plate, as a separate camera housing structure (without the lens) is primarily an alternate construction.

Located between the beam splitter 14 and the image projecting device 12 and the image capturing device 20, are suitable polarizers which reduce light projected therethrough and allow some of the undesired reflected light from the beam splitter or rear of the lens to be cancelled out. These polarizers 22 are identical and have their polarizing axis at right angles to each other. The polarizer in front of the camera 20 cancels out unwanted reflections by the beam splitter or back of the lens, and will aid in providing saturated colors in the photograph when color photographic film is utilized in the camera 20. If desired, the polarizer located in front of the camera 20 may be of the type that has a circular polarizer (depolarizer) on one side, and a regular or more conventional polarizer on the other side. With such a polarizer, the regular polarizing side should face the beam splitter 14. An example of one such polarizer is the Leitz type No. 13370, manufactured by Leitz Wetzler GmbH (Leica).

It is also within the scope of the invention to employ a further polarizer (not shown) of the rotating type in front of the polarizer 22 located between the projector 12 and beam splitter 14 so as to provide a variable brightness control. Such a polarizer is disposed in a rotating mount that keeps the polarizer in the same fixed position, but allows the polarizer to be rotated on its own axis in the mount. By rotating the polarizer, one can adjust for the best single image on the screen which corresponds to minimum brightness of the slide as seen through the other side (B) of the polarizer. With the rotating polarizer locked in place, the remaining polarizer is locked permanently in position.

If desired, to further uniformly reduce the brightness of the object 24 and projected screen background, neutral density filters or a rotating polarizer may be employed in front of the camera or image capturing device 20. To control excessive projection (lamp) brightness, other neutral density filters may likewise, if necessary, be provided between the transparency of slide 13 and the light source of the projector 12.

The foreground object 24, such as a model, is positioned in front of the projection screen 18 and illuminated by a pair of light sources 26, such as spotlights, located at an angle with respect to the projection screen 18 and beyond the projection field of the light rays entering and leaving the lens 16. The position of the light sources or spotlights 26 should be adjustable, or the intensity of such spotlighting sources should be variable. Generally, mostly any type of screen 18 can be employed, but a directional type of screen is preferred. Due to the directional characteristics of the screen, the light directed on the screen 18 will appear to wash out the reflected image when viewed from the side, and same will not be reflected back to the film plane. Also, such light will not appear on any developed photograph, nor will it be seen by a photographer using a viewfinder, in a situation where a camera body is employed. Additionally, a directional type screen will reflect the brightest image back to the lens 16.

With the exception of the projection screen 18, object 24 and spotlights 26, the remaining primary elements of the system, as noted hereinabove, are all suitably mounted in a fixed planar relationship in a generally rigid frame or housing (not shown) such that the axis of the projector 12 and the camera 20 are 90° apart with the beam splitter 14 bisecting the angle between them at 45°. As a result, the projector 12 is on the same virtual axis as the camera 20. In addition, the distance between the image capturing plane or film plane 28 in the camera 20 and the lens 16 is identical to that between the image projection plane 30 (represented as a slide or transparency) and the lens 16.

Any stray light and other undesirable reflections may be conveniently trapped by a suitable light trap 32. This trap 32 is basically a chamber suitably lined with nonreflective material and it is designed so as to preclude bright light passing through the beam splitter 14 from reflecting back to the beam splitter 14. Such a light trap is generally recommended for the system 10 and is provided in such a position, as shown in the drawings at least with respect to the embodiment of FIG. 1. Of course, the light trap may in effect form part of the overall enclosure or housing of the system, shown in phantom and identified by the reference numeral 34.

The lens 16 is preferably of the more recently introduced multi-coated type, but it may be of either anamorphic type or of the non-anamorphic type. Such a multi-coated lens aids in preventing undesirable reflections that could degrade the photograph, and provides improved correction and refraction characteristics as transmission of the image is very high and generally in the range of about 97%. The beam splitter may also be suitably coated for best results and may be, if desired, approximately 50% reflective for best results.

Although not shown in any of the figures of the drawing, if a single lens reflex camera (without the lens) is incorporated in the design of the system 10, it may be conveniently mounted on the housing of the system so as to be removable therefrom. With such an arrangement, the camera with its lens mounted or threaded back on the camera body can then be utilized as an ordinary camera. Of course, the system 10 would include suitable aligning devices so that the camera is repositioned and locked back in the identical place each time it is used in connection with the front projection system 10.

If a camera is employed in the system, whether or not it is removably mounted, it may comprise an integrally mounted light meter which can be used to obtain the proper exposure settings. One can, of course, utilize a separate light meter for improved accuracy or for checking the camera's light meter. As an alternative, to insure that the camera meter reads correctly, a rotating polarizer could be employed between the beam splitter 14 and the camera or image capturing device 20.

As an alternative system, in lieu of the semi-silvered mirror or beam splitter 14, a rotating polarizer may be employed. However, such an arrangement requires adjustment of the rotating polarizer by the manufacturer for the best single image on the screen 18 which corresponds to minimum brightness of the slide or transparency 13 as seen through the side B of the polarizer. When such a position is achieved, the "laminated" polarizer with circular polarizer on side A and normal polarizer on side B is then locked permanently in place. Another polarizer of the normal and conventional type is used as noted hereinbefore to adjust for minimum stray light (minimum brightness) on the ground glass-film plate or film plane of the camera 20. Depending on the type of light source employed (projector lamp, photoflash, or other illuminating source), such polarizer may be moved from in front of the camera device 20 to a position in front of the slide or transparency 13 and similarly adjusted as required by rotation and thereafter locked permanently in position. Such adjustment of this polarizer also eliminates the light that passed through and was not reflected by the first polarizer mounted at a 45° angle with respect to the lens axis.

Figure 2:
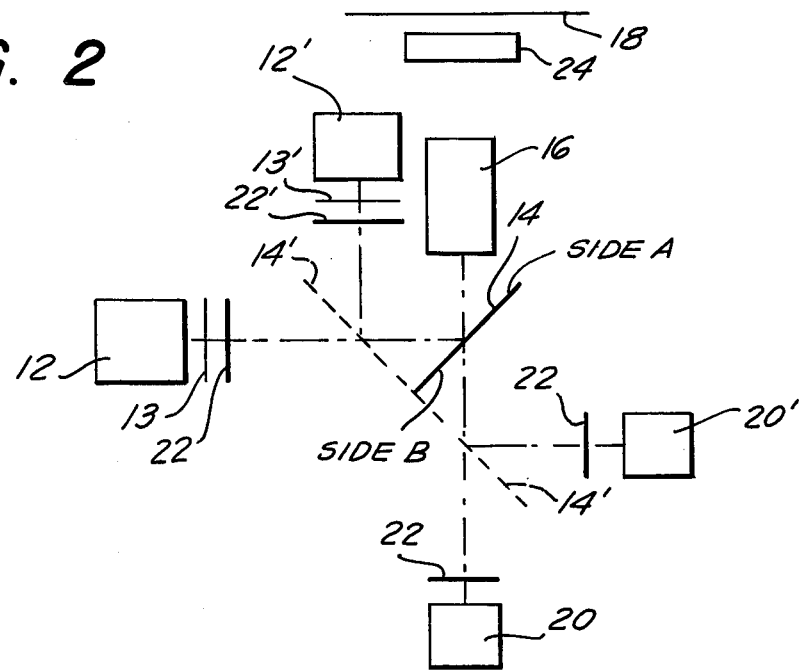
FIG. 2 is a "schematic" view of an alternate embodiment of the invention illustrating three beam splitters and showing dual cameras and dual projectors.
Figure 3:
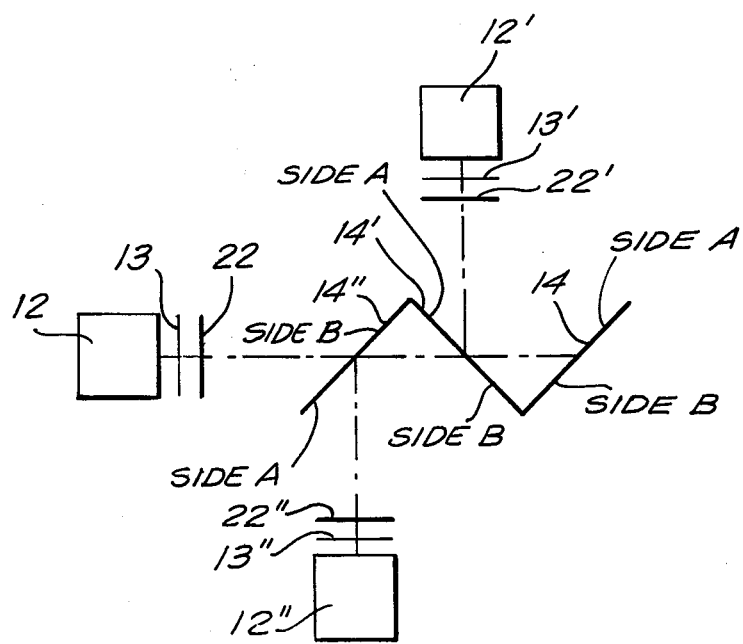
FIG. 3 is a further "schematic" view of yet another modification of the invention, illustrating three projection devices and associated projectors.

In FIGS. 2 and 3, like reference numerals are employed and prime reference numerals are used to identify additional elements of the same type where provided in such modified front projection systems. As best shown in FIG. 2, a pair of additional beam splitters 14' are mounted at right angles (90°) with respect to the first beam splitter 14 and are illustrated with phantom lines. With such an arrangement or set-up, utilizing another projector 12' and camera device 20' with their associated polarizors 22', one can simultaneously obtain a pair of images to be photographed, such as, for example, a black and white photo as well as a color photo. As will be appreciated, this modified front projection system would lend itself to numerous applications where more than one photograph is desired without having to set-up and take two separate photographs at different times.

With such a system shown in FIG. 2, to function properly and accurately, the distance from the lens 16 to the projector 12' must be substantially exactly the same as the distance from the lens 16 to the projector 12. In a like manner, the distance from the lens 16 to the camera 20' must be the same as the distance from the lens 16 to the camera 20.

In the modification of FIG. 3, which is only partially shown for simplicity purposes as the remaining portion should be inherent from FIG. 2, two beam splitters 14' and 14" mounted at right angles (90°) with respect to each other as well as the first are being mounted at a right angle also to the basic beam splitter 14. With such system, a pair of additional camera devices (not shown) can be disposed on opposite side of the beam splitter 14 in a likewise similar manner as the one additional camera 20' of FIG. 2 but with the two additional cameras mounted at a distance in front of their associated beam splitters (not shown) which establishes the same exact measurement characteristic or property as noted hereinabove with respect to FIG. 2.

It will be appreciated from FIG. 3 that in the embodiment of FIG. 2, any desired number of additional beam splitters can be set up at right angles with respect to each other and the first beam splitter 14 and extend from the first placed beam splitter 14' outwardly toward projector or image projecting device 12 and camera or image capturing device 20. With such a system, a plurality of photographs can be made and developed with a single set-up and without the need for any reproduction equipment.

It will also be appreciated that with even only one single polarizer mounted in front of the image capturing device, the ability to control brightness is enhanced as one is then capable of exercising control over the whole system, whereas if the polarizer is mounted in front of the image projecting device, control is then only exercised over the background image.

In operation, the front projection system of the present invention functions in the following manner. The light source or image projecting device 12 behind the slide or transparency 13 projects the image of the transparency on to side A of the beam splitter 14 (or polarizer at the 45° angle). FIG. 1 of the drawing illustrates the edges of the image by dotted lines. The image is reflected by the beam splitter 14 and passes through the lens 16 with its suitable focusing mount, which is used to focus the transparency image on the projection screen 18. The object 24 photographed casts a shadow behind it on the projection screen 18, as best shown in FIG. 1.

The transparency image on the screen 18 is then reflected back in the same path that it was projected on the screen 18, and the image passes through the lens 16 back to the beam splitter 14 (or polarizer). The image also passes through the other polarizers 22 which are also transparent and which may be mounted in front of the image capturing device 20, and is focused on the ground glass located in the film plane 28. The slide or transparency 13 is disposed at a distance from the light source or projector 12 for maximum brightness and sharpness of the image projected on the screen 18, but the distance from the transparency to the beam splitter 14 is substantially equal to the distance from the beam splitter 14 to the film plane 28. In other words, if the transparency 13 were rotated counterclockwise 90 degrees, with the center of the beam splitter 14 as an axis of rotation, the transparency 13 should fall exactly at the film plane 28. Thus, when the transparency 13 is sharply focused on the screen 18 by the lens 16, the image on the screen 18 reflected back to the film plane 28 will automatically be in sharp focus also. Any object 24 placed in front of the screen 18 will also be in sharp focus within the limit of the depth of field of the lens 16 being used. The depth of field of the lens 16 may also be used to keep the object 24 in sharp focus and to put the projected transparency background image out of focus to any desired degree, and vice-versa. The position of the polarizers are not critical except that they can only be placed at the locations shown without introducing unwanted reflections.

If the two spotlights 26 are not turned on, the object 24 being photographed will be dimly illuminated by the light from the projected image of the slide 13, and will cast a shadow on the screen 18. As a result thereof, the object 24 being photographed will appear as a silhouette, inasmuch as it is nowhere reflective as the directional screen 18. With the preferred directional type of the screen 18, the projected image from the screen is reflected back along the same optical path that it was projected onto the screen 18, and will be focused, as noted hereinabove, by the lens 16 through the beam splitter 14 and any associated polarizers 22, onto the film plane 28 in the camera 20. With the spotlights 26 turned on, the light hitting the screen 18 will appear to wash out the reflected image when viewed from the side, and will not be reflected back to the film plane 28 and also will not be seen in the camera's viewfinder or appear in the photograph.

As noted hereinabove, the background, of course, may be deliberately thrown out of focus to any desired degree by the focusing action of the lens 16 while the object 24 will remain sharp. In addition, the shadow of the object itself is not seen by the system since it is hidden substantially directly behind the object itself, and thus no objectional dark outlines around the object being photographed is believed possible.

The illumination on the object 24 should be adjusted for about the same brightness as the projected image on the screen 18, or at least within the brightness latitude of the film being employed in the camera 20. The shutter speed on the camera is also adjusted for the correct exposure, and brightness control is, of course, maintained by use of the polarizers (including those of the rotating type if utilized) and neutral density filters if necessary.

With the image focused in the image capturing device and the picture otherwise ready to be taken, the two spotlights and light source (projector) are connected to the shutter for the lens so as to light up upon activation of the shutter mechanism. Thus, the film is intentionally exposed as is done with a reflex camera or other conventional image capturing device.

In the alternate modifications of the invention, as best shown in FIGS. 2 and 3, it should be apparent that the quality of the projected image decreases as the number of beam splitters employed increases. As a general rule, using a percent transparent beam splitter (50% reflective and 50% transparent), half the amount of light and half of the resolution of the projected or reflected image is generally lost for each beam splitter. In the case of FIG. 2, as each beam splitter 14' constitutes a second beam splitter as each is used in conjunction with the primary beam splitter 14, and thus one-quarter of the projected light intensity and resolution reaches projecting lens 16. Similarly, in the case of FIG. 3, one-quarter of the projected light intensity and resolution reaches the projecting lens (not shown) from the projection 12', and one-eighth of the projected light intensity and resolution reaches the projecting lens (not shown) from the projector 12″ or projector 12. Also, the same principle applies with respect to light passing through beam splitters when the reflected image emerges from the rear of the lens 16 and travels through beam splitters to each image capturing device. As a practical consideration, the number of beam splitters that can be tolerated depends upon the image quality requirements of the user. If desired, one can increase the resolution of projected images by using larger slides or transparencies so long as same can be fully projected by the particular lens used in the system. Of course, special lenses which have a wider coverage than a conventional lens of the same focal length can be used to allow a larger transparency or slide to be projected. For example, a Schnieder Componon Wide Angle lens manufactured by Schnieder Optics, GmbH would satisfy the above conditions.

In the practice of the front projection system of the invention where more than one beam splitter is employed, multiple image projecting devices can be used singly or simultaneously. For example, when used simultaneously, two or more projected images cam be superimposed (such as titles or subtitles projected on a common background) or in the case of a motion picture device, one background may be dissolved into a second background. With respect to image capturing device, different types of image capturing devices may be used simultaneously or singly. For example, different format image capturing devices, such as T.V., still or motion picture cameras, can be employed. In another example, similar cameras using different size or type film may be used.

While the invention has been described, disclosed, illustrated and shown in terms or an embodiment or modification which it has assumed in practice, the scope of the invention should not be deemed to be limited by the precise embodiment or modification herein described, disclosed, illustrated or shown, such other embodiments of modifications as may be suggested to those having the benefit of the teachings herein being intended to be reserved especially as they fall within the scope and breadth of the claims here appended.

What is claimed is:

1. An improved front projection system comprising: an image projecting device having a light source and an image projecting plane where an image producing device is located, means for focusing said light source, an image capturing device having an image capturing plane where an image capturing medium is located, a generally semi-reflective/semi-transparent element, and a common lens having front and rear surfaces for use with both said image projecting device and said image capturing device; said image projecting and capturing devices, said semi-reflective/semi-transparent element and said common lens being perpendicular to a mounting surface with the axis of said projecting and capturing devices and said common lens coinciding in a common plane and intersecting approximately at the center of said semi-reflective/semi-transparent element; said semi-reflective/semi-transparent element being disposed behind said rear surface of said common lens at an angle of about 45° with respect thereto; the planes of said image projecting and capturing devices being generally perpendicular to each other and each of the planes being at about a 45° angle with respect to said semi-reflective/semi-transparent element and with said element positioned so that light projected on the surface of said element is reflected to said rear surface of said common lens; the distance from the centers of the planes of said image projecting and capturing devices to the center of said semi-reflective/semi-transparent element being equal; and lens moving means for focusing said common lens; whereby said image projecting device and said image capturing device are used simultaneously for composite photography, commonly known as front projection.

2. The front projection system according to claim 1, further including at least one additional image projecting device and at least one additional semi-reflective/semi-transparent element; and said additional semi-reflective/semi-transparent element is positioned between said image projecting device and said semi-reflective/semi-transparent element at about a right angle with respect thereto, whereby said image projecting devices may be used separately or simultaneously.

3. The front projecting system according to claim 2, further including at least one additional image capturing device and at least one additional semi-reflective/semi-transparent element; and said additional semi-reflective/semi-transparent element is positioned between said image capturing device and said semi-reflective/semi-transparent element at about a right angle with respect thereto.

4. The front projection system according to claim 3, wherein said semi-reflective/semi-transparent elements disposed between said semi-reflective/semi-transparent element and either of said image projecting device or said image capturing device form a series of mirror images; and alternate elements of said series are parallel with respect to each other and each of said elements being disposed at right angles with respect to any adjacent element.

5. The front projection system according to claim 1, including at least one polarizing device disposed between said semi-reflective/semi-transparent element and said image projecting device.

6. The front projection system according to claim 1, including at least one polarizing device disposed between said semi-reflective/semi-transparent element and said image capturing device.

7. The front projection system according to claim 1, wherein said semi-reflective/semi-transparent element is a beam splitter.

8. The front projection system according to claim 1, wherein said semi-reflective/semi-transparent element is a polarizer.

9. The front projection system according to claim 1, including a projection surface and external illuminating means for illuminating an object whose image is to be captured.

10. The front projection system according to claim 9, wherein said projection surface is a directional type projection screen.

* * * * *